United States Patent [19]

McCormack

[11] Patent Number: 4,718,273

[45] Date of Patent: Jan. 12, 1988

[54] COMBINATION ALPHA, STATIC AND TOTAL PRESSURE PROBE

[75] Inventor: William H. McCormack, Tuscon, Ariz.

[73] Assignee: The Garrett Corporation, Los Angeles, Calif.

[21] Appl. No.: 815,406

[22] Filed: Dec. 31, 1985

[51] Int. Cl.$^4$ .............................................. G01C 21/00
[52] U.S. Cl. ...................................................... 73/180
[58] Field of Search ....................... 73/180, 182, 861.65, 73/861.66, 861.67, 861.68, 189

[56] References Cited

U.S. PATENT DOCUMENTS

| | | | |
|---|---|---|---|
| 1,869,962 | 8/1932 | Golden | 73/182 |
| 2,660,056 | 11/1953 | Schuck et al. | 73/180 |
| 2,725,746 | 12/1955 | young | 73/180 |
| 2,876,640 | 3/1959 | Beach, Jr. et al. | 73/182 |
| 2,923,152 | 2/1960 | Mabry, Jr. et al. | 73/182 |
| 2,971,375 | 2/1961 | Fieldgate | 73/180 |
| 3,029,639 | 4/1962 | Groesbeck | 73/861.65 |
| 3,043,142 | 7/1962 | Eiland, Jr. et al. | 73/182 |
| 3,079,758 | 3/1963 | Vogel et al. | 60/97 |
| 3,120,123 | 2/1964 | Werner et al. | 73/182 |
| 3,228,247 | 1/1966 | Hansen et al. | 73/182 |
| 3,244,001 | 4/1966 | Pettingall | 73/180 |
| 3,318,146 | 5/1967 | De Leo et al. | 73/180 |
| 3,585,859 | 6/1971 | De Leo et al. | 73/182 |
| 3,673,866 | 7/1972 | Alperovich et al. | 73/182 |
| 3,914,997 | 10/1975 | Pinckney | 73/182 |
| 4,096,744 | 6/1978 | De Leo et al. | 73/182 |
| 4,182,188 | 1/1980 | Britton et al. | 73/180 |
| 4,230,290 | 10/1980 | Townsend et al. | 73/180 |
| 4,378,696 | 4/1983 | De Leo et al. | 73/180 |
| 4,378,697 | 4/1983 | De Leo et al. | 73/182 |

FOREIGN PATENT DOCUMENTS 692496 6/1940 Fed. Rep. of Germany .
908572 10/1962 United Kingdom .

*Primary Examiner*—Donald O. Woodiel
*Attorney, Agent, or Firm*—Henry M. Bissell; Albert J. Miller; James W. McFarland

[57] ABSTRACT

An air data sensor probe for providing measurements of total pressure, static pressure and angle-of-attack for an aircraft in flight. The probe is essentially cylindrical with a hemispherical nose. It has a vertically elongated central opening for measurement of total pressure and a plurality of off-axis openings, manifolded by pairs, to measure angle-of-attack. Static pressure is measured by a plurality of ports mounted back from the nose, manifolded together to provide the static pressure reading.

27 Claims, 7 Drawing Figures

COMBINATION ALPHA, STATIC AND TOTAL PRESSURE PROBE

BACKGROUND OF THE INVENTION

1. Field of the Invention

This invention relates to aircraft instrumentation and, more particularly, to devices extending into the air stream for sensing various pressures which are used to develop derived air data for instrument readout.

2. Description of the Prior Art

It has long been customary to use probes which project from or are mounted to the external surfaces of an aircraft to make various air data measurements which are useful in providing certain instrument displays to a pilot. These probes have been of various types, ranging from the early Pitot tube to multi-aperture, multi-purpose probes mounted at selected points on the aircraft. One particular probe which is used in certain trans-sonic and supersonic aircraft is disclosed in the De Leo et al U.S. Pat. No. 3,318,146. This is a generally cylindrical probe with a hemispherical forward surface and is designed to be mounted to extend laterally from the side of an aircraft. Other probes of a similar type may have a cylindrical body with a conical or ogival forward surface.

The De Leo et al probe contains a forward facing total pressure ($P_T$) port, located on the central axis of the probe, and four other ports distributed every 90° about the central axis. A first pair of these ports is located in a central vertical plane, the other pair being located in a central horizontal plane. In this probe, each of the ports is connected to its own separate conduit which leads to a corresponding sensor coupled to a computer in which appropriate scale factors can be supplied for developing desired output information. In straight and level flight, the pressure at the central axis port is total pressure, equal to the normal Pitot or stagnation pressure of the aircraft. The pressure mmeasurement at the central port admittedly varies with aircraft attitude. In this particular instrument, the off axis ports are used to derive measurements of angle of attack ($\alpha$) and angle of side slip ($\beta$). With the five pressure measurements available from this probe, angle of attack, angle of side slip, total pressure, static pressure and Mach number can be derived. Mach number is the ratio of the speed of the aircraft to the speed of sound in the fluid medium and is a function, for the De Leo et al probe, of the average pressure between the off-axis ports in the horizontal plane divided by the total pressure. The relationship between the pressures and Mach number can be expressed as:

For subsonic speeds, $P_T/P_S = (1 + 0.2M^2)^{3.5}$ (1)

For supersonic speeds,
$P_T/P_S = (1.2M^2)^{3.5}[6/(7M^2 - 1)]^{2.5}$ (2)

where M is Mach number, $P_T$ is total pressure and $P_S$ is static pressure. $P_S$ can be calculated when $P_T$ and M are known or it can be measured independently by static pressure ports.

While the scale factor and certainty of air flow angle detection of hemisphere probes like that of De Leo et al are superior in performance, the total pressure measurement varies with air flow angle approximately in proportion to a cosine squared function. It is preferable that the total pressure measurement be insensitive to angle of air flow to at least +/−20 degrees.

An alternative probe configuration utilizes the angle-insensitive ogival total pressure source in conjunction with angle-of-attack sensing ports which are back on a second conical segement of the cylindrical afterbody. Probes of this type are disclosed in the De Leo et al U.S. Pat. Nos. 4,096,744 and 4,378,696. The characteristic of this differential pressure to angle of attack is much weaker at low angles and becomes non-linear at high angles of attack with a consequent loss of predictability.

SUMMARY OF THE INVENTION

The hemisphere-cylinder probe provides Pitot and static pressures and $\alpha$ and $\beta$ sensing pressures. The Pitot opening is large in the $\alpha$ dimension and small in the $\beta$ dimension. This non-symmetry fits the aircraft's performance range for nose boom mounting, and is also suitable for fuselage side-mounting where $\beta$ is small in amplitude and, for that reason, is not measured. The Pitot pressure which is developed is superior through lack of $\alpha$ sensitivity to the usual five-port hemisphere Pitot probe and is just as good as the axis-symmetric ogival Pitot probe. Since a hemisphere surface is used, the $\alpha$ and $\beta$ pressures so derived are dependable and have a higher scale factor than angle-dependent pressure taken farther back on an ogive cylinder probe.

In brief, arrangements in accordance with the present invention comprise an air data sensor, or probe, which combines a total pressure source and a high sensitivity, angle-of-attack source in the forward end, or nose of the probe. The probe also includes static pressure openings which are located downstream, along the barrel of the probe. This combination probe is configured for right-angle mounting on either side of the forward fuselage of an aircraft.

In most airplane applications, the angle of attack range is many times the angle of yaw range. With a probe installation on the side of an airplane, the local angle of yaw is an attenuated function of true angle because of the flow confinement by the fuselage. A right-angle probe on the side of a fuselage, therefore, has little local angle of yaw to contend with and furthermore is not used to detect aircraft yaw, and liberties may be taken with the yaw design considerations.

The physical entry of total pressure probes of the prior art has been axis-symmetric, with equal range of flow angle insensitivity to both angle of attack and yaw. The large cross section of the total pressure opening tends to distort the pressure distribution on the adjacent trailing probe surface on which the air flow angle might be sensed. Fuselage-side mounting of the probe allows a non-symmetric total pressure opening, and a preferred embodiment of my invention has such a total pressure opening: large in the $\alpha$ (angle of attack) axis and small in the $\beta$ (angle of yaw) axis. By providing such a non-symmetrical opening for total pressure, benefits may be realized from the added probe topography in the direction of yaw.

In addition to having a non-symmetrical, vertically elongated central opening at the forward end of the probe for the measurement of total pressure, the probe of my invention includes two pairs of openings situated outward from the central axis and central opening, along the curved surface of the nose or forward portion of the probe. These pairs of openings straddle the vertical plane of the probe with one pair being located above the central horizontal plane of the probe and the other below the horizontal plane. Each pair is manifolded together to produce one pressure per pair.

In one particular configuration, the topography of the probe is hemispherical at the forward end of an elongated cylindrical barrel. The shape of the nose may, however, be any repeatably producible three-dimensional surface across which a tractable pressure distribution is produced. The alpha sensing scale factor decreases as the straddle separation increases. In the case of a purely hemispherical nose shape, the scale factor for alpha sensitivity, for an axis straddle of $+/-45°$, is 59% of that of zero straddle—i.e., where a single opening is located on the central vertical plane for each straddle pair. However, this lower scale factor is still larger than with probes utilizing corresponding ports along the cylinder afterbody or second conical sections. Moreover, because the preferred embodiment of my invention is a forward facing hemisphere, there is a minimum of forebody boundary layer influence.

BRIEF DESCRIPTION OF THE DRAWING

A better understanding of the present invention may be had from a consideration of the following detailed description, taken in conjunction with the accompanying drawing in which.

DESCRIPTION OF THE PREFERRRED EMBODIMENT

Figure 1:
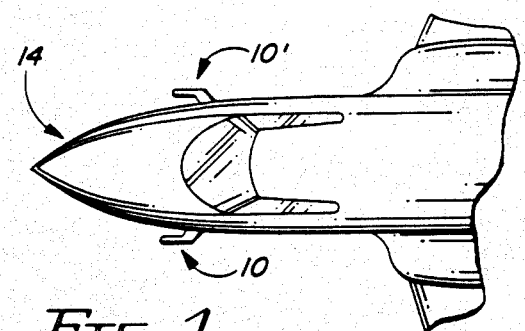
FIG. 1 is a symbolic plane view showing a portion of an aircraft with a pair of sensor probes mounted thereon.
Figure 2:
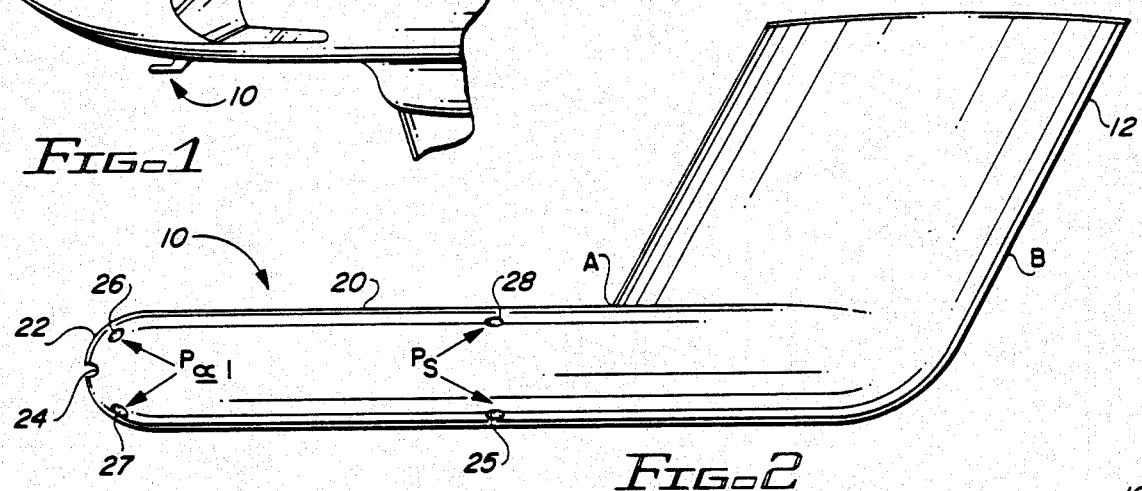
FIG. 2 is plan view showing one particular arrangement of a sensor probe of the present invention.

Referring particularly to FIGS. 1 and 2, a short strut-mounted air data sensing probe, generally designated by the refeerence numeral 10, is shown mounted onto the exterior skin or surface of an aircraft 14 in the usual manner, protruding from the side of the aircraft. A second probe 10' is shown mounted on the opposite side of the aircraft 14, indicating that a pair of probes 10 may be installed, if desired for redundancy and back-up.

The probe 10 has a strut 12 and conventional mounting hardware for attachment to the exterior surface of the aircraft and extends laterally outward therefrom. The strut 12 is streamlined in cross section and extends forwardly or upstream as well as outwardly when related to the direction of relative fluid flow. The probe 10 comprises a cylindrical barrel 20 extending forwardly from the outboard end of the strut 12 and having a hemispherical nose portion 22 which faces into the air stream when the aircraft is flying. When in flight, air flows past the probe 10, and air data measurements can be taken from the probe. As indicated in FIG. 2, the probe 10 is provided with a central opening 24 for measuring Pitot or total pressure, and a plurality of openings 26 for measuring α. Another plurality of openings 28 is located back along the barrel 20, spaced about the periphery of the cylindrical barrel 20. The openings 28 serve to measure static pressure and are manifolded together to provide a single $P_S$ measurement.

Figure 3:
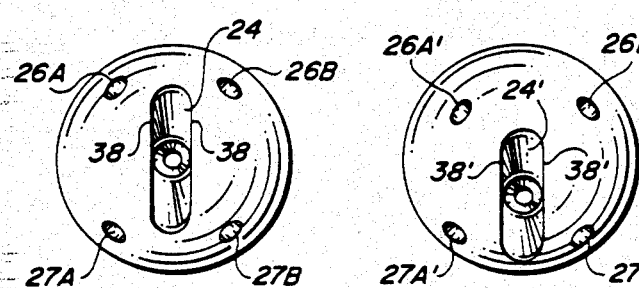
FIG. 3 is a frontal view of the sensor probe of FIG. 2.
Figure 4:
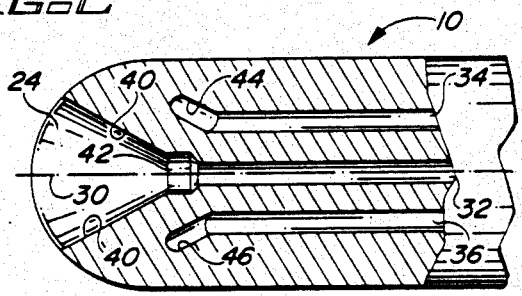
FIG. 4 is a side view, partially broken away, of a portion of the sensor probe of FIG. 2.

As more particularly shown in FIGS. 3 and 4, the central frontal opening 24 is elongated in the vertical direction and is symmetrically configured relative to a central longitudinal axis 30 of the cylindrical probe 10. A first conduit 32 is joined to the elongated central opening 24 and extends along the axis 30. Second and third longitudinal conduits 34, 36 extend alongside the conduit 32 on opposite sides thereof for communicating with the respective pairs of off-axis openings 26, 27. The configuration of the central opening 24 is generally fan-shaped with the left and right sides being at a slight angle with respect to each other, converging with distance from the opening, and with the upper and lower terminiating surfaces being curved and angled toward the central axis 30 at approximately 30°, thus providing a total included angle of approximately 60°. A central chamber 42 is located at the inner termination of the central opening 24 and the central conduit 32 communicates with this chamber.

Figure 3A:
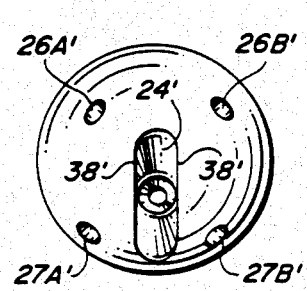
FIG. 3A is a similar view of a variant of the sensor probe of FIG. 2.

The axis of symmetry of the hemisphere surface openings may be depressed below the horizontal so that an asymmetrical angle-of-attack range may be accommodated about a probe body installation angle that is selected for minimum drag at an independently selected flight condition. The α spread for the probe described is 60° and, with the opening's symmetry lying on the cylinder axis, the input α range is plus to minus 30° to the Fuselage Reference Line (FRL). The plane of opening symmetry may be established at 20° down from the cylinder axis, so that a more useful aircraft attitude range of minus 10° to plus 50° FRL is accommodated while maintaining the airflow-to-probe feature angle within 30°. The cylinder axis, for this example, is 0° FRL and the minimum probe drag occurs with airflow at 0° FRL. Such an arrangement is shown in the frontal view of FIG. 3A in which corresponding elements are designated by the same reference numerals primed. Independent adjustment of the probe feature axis relative to the probe body axis in this manner is outside the capability of the probes of the De Leo et al U.S. Pat. Nos. 4,096,744 and 4,378,696.

The upper and lower conduits 44, 46, extending respectively between the upper pair of off-axis openings 26 and the associated conduit 34 on the one hand and between the lower off-axis openings 27 and the associated conduit 36 on the other, are angled to intercept the passages to the hemisphere openings 26 somewhat below the surface. The openings 26, and integral passages, are drilled normal to the hemisphere surface. The pair of upper angled conduit portions 44 join at the upper conduit 34; similary for the lower angled conduit portions 46 which join at the lower conduit 36.

In one particular embodiment of the invention, the diameter of the cylindrical barrel was 0.75 inches with the spherical radius of the hemispherical nose portion being 0.375 inches. The static pressure ports 28 were mounted on centers in an orthogonal plane located five inches behind a transverse plane at the front of the probe. The diameter of the chamber 42 was 0.15 inches, with the diameter of the central conduit 32 being 0.0625 inches. The width of the central opening 24—that is, the distance between the sides 38 at the opening—was 0.15 inches. The distance from the frontal plane of the probe to the rearward edge of the chamber 42 was 0.5 inches. The diameter of the off-axis openings 26A, 26B, 27A, 27B, and of the static pressure ports 28 was 0.0625 inches, as was the diameter of the conduits communicating therewith, although this dimension can be varied somewhat. The vertical dimension of the central opening 24 was 0.497 inches. The ports 28 are mounted 36° about the surface of the cylindrical barrel 20 from the vertical central plane of the cylinder. The plane of the static pressure ports is two inches forward of the termination of the strut 12 at point A (FIG. 2). The longitudinal dimension of the strut 12, taken along the extension of the inboard edge of the cylinder 20 as it is faired into the strut 12 (the distance between points A and B in FIG. 2) was four inches, and the transverse dimension of the strut 12 from its inboard edge where it joins the surface of the aircraft to the central longitudinal axis of the probe was also four inches. The conduits from the various pressure ports extend back through the probe and strut to couplings leading through the aircraft skin and via tubes within the aircraft to transducers which may develop signals for direct instrument display or for processing in an onboard computer, as known in the art. The dimensions set forth above for one particular embodiment of the invention are not critical, and they may be varied within reasonable limits to accommodate specific design considerations.

The disclosed embodiment of the present invention provides favorable performance results in the development of data used for the measurement of total pressure, static pressure and angle of attack when compared with other known air data sensors. One particular feature of the present invention which contributes to this improved performance is the positioning of the off-axis ports on the nose of the probe relative to the position and configuration of the central axis opening. By moving the angle-of-attack ports off-axis into $\beta$ territory (where angle of yaw is usually measured), the $\alpha$-pressure signal improves by getting out from under the flow stream that spills from the total pressure opening. In addition, that flow stream is made narrow by limiting the $\beta$ opening dimension. In order to move the $\alpha$ ports off the zero degree axis, pairs of ports straddling the axis at equal distances are provided. These ports are manifolded by pairs to give a single sensed $\alpha$ pressure measurement per pair. As a result, $\beta$ sensitivity in the $\alpha$ sensing pressure is reduced to one-half what it would be if the $\alpha$ ports were positioned on the zero degree axis.

Figure 5:
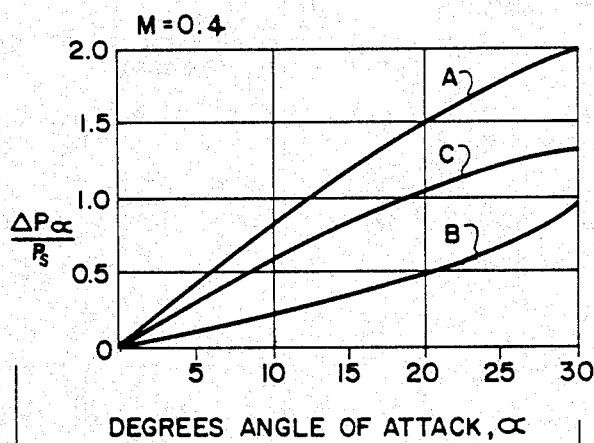
FIGS. 5 and 6 are graphs showing results of wind tunnel tests of the probe of FIG. 2 compared with certain probes of the prior art.

A comparison of the performance of the probe of the present invention with that of probes corresponding to the De Leo et al patents cited hereinabove is presented in the graphs of FIGS. 5 and 6. FIG. 5 shows $\alpha$ sensitivity, $\Delta P_\alpha/P_S$, as a function of the angle of attack, $\alpha$. The data represented by the various curves in these graphs were taken in wind tunnel tests with air stream velocities from 0.2 to 0.4 Mach number. The upper curve A in FIG. 5 corresponds to the testing of a sensor of the type disclosed in the De Leo et al U.S. Pat. No. 3,318,146. Curve B of FIG. 5 represents data taken from a strut-mounted multiple static tube like that of De Leo et al U.S. Pat. No. 4,378,696. Curve C of FIG. 5 represents wind tunnel test data taken from a probe in accordance with the present invention. Curve C has the characteristics of the well known and dependable hemisphere probe, curve A; and, while attenuated from curve A, curve C is larger than the signal from after-body located ports represented by curve B.

Figure 6:
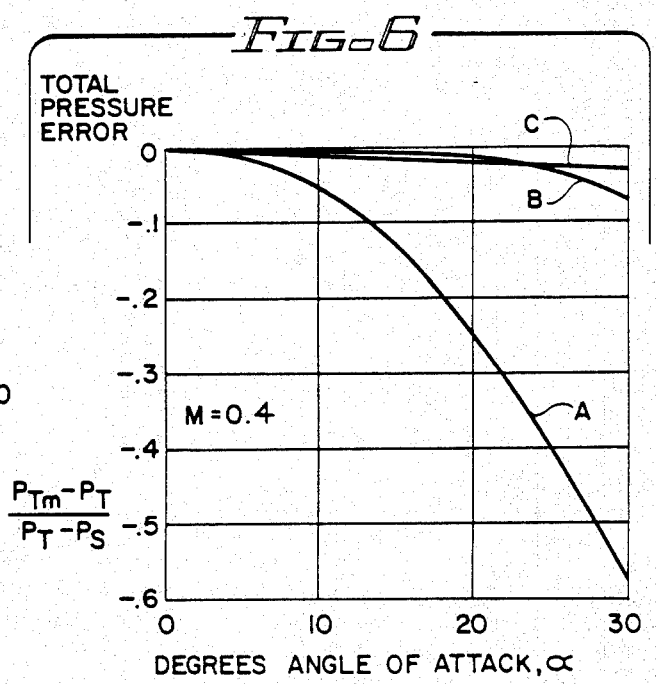

FIG. 6 shows total pressure error, $P_{TM}$-$P_T$/$P_T$-$P_S$, as a function of $\alpha$ where $P_{TM}$ is the measured value of $P_T$. As with FIG. 5, curves A, B and C correspond to the '146 patent sensor, the '696 patent sensor, and the probe of the present invention, respectively. It is apparent that, with respect to the measurement of $P_T$ error, the probe of my invention performs comparably to the conical section probe of De Leo et al and is far superior to the performance of the De Leo et al hemispheric cylinder probe.

There has thus been disclosed a combination air data probe which provides superior results in use by virtue of its structured configuration and the shape and location of the various pressure ports. The device is small and is aerodynamically streamlined for minimum drag and disruption of the air stream in flight. The port used for measuring total pressure is relatively insensitive to large angles of attack and small angles of yaw. The off-axis ports used in measuring angle-of-attack are relatively insensitive to yaw. The device is reliable and is relatively free of maintenance problems.

It should be particularly understood that, although the preferred embodiment of the invention which is disclosed hereinabove is shown in the form of a side-mounted probe, the structure embodying the invention is not to be limited to such a configuration. The cylindrical probe with hemispherical nose portion of my invention as disclosed hereinabove may readily be mounted on a boom extending forward of the aircraft in conventional fashion. The symmetrical arrangement of the respective openings of the probe of my invention renders it readily adaptable to mounting on a nose boom with performance of the probe being substantially as described hereinabove with respect to the side-mounted arrangement. With nose boom mounting, the angle of yaw, as well as angle of attack, may be measured by bringing out the probe individual pressures from all four openings rather than the two manifolded average pressures, as in the side mount configuration.

Although there have been described above specific arrangements of a combination alpha, static and total pressure probe in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An air data sensor probe for installation on an aircraft comprising:
   a generally cylindrical barrel portion and a rounded nose portion having an exterior wall closing the forward end of the barrel portion, the probe having a central longitudinal axis;
   a first opening in the wall of said nose portion, facing generally forward for measuring total pressure, said opening being elongated in a preferred direction which is generally transverse to the central longitudinal axis;
   a plurality of off-axis second openings in said nose portion wall, displaced from said first opening, said second openings being interconnected by pairs for sensing pressure which are indicative of angle of attack;
   at least one additional opening mounted in said barrel portion rearward of said nose portion for measuring static pressure; and
   a plurality of conduits coupled to the respective openings for directing the measured pressure signals to a remote location.

2. The apparatus of claim 1 wherein the first opening is elongated in the direction of a vertical plane through said longitudinal axis and is generally fan-shaped in vertical section.

3. The apparatus of claim 2 wherein the upper and lower boundary walls of said first opening terminate in a central chamber which is coupled to one of said conduits extending along said central longitudinal axis.

4. The apparatus of claim 3 wherien the side walls of said first opening are non-parallel and are spaced more closely together than the upper and lower boundary walls of said opening.

5. The apparatus of claim 4 wherein said non-parallel sidewalls converge with distance from said first opening.

6. The apparatus of claim 1 wherein the first opening is located centrally about said central longitudinal axis.

7. The apparatus of claim 6 wherein the second openings are symmetrically displaced about the nose portion and are separate from said first opening.

8. The apparatus of claim 7 wherien said second openings are manifolded together by pairs, said openings above the horizontal central plane being manifolded together in a pair displaced from a vertical plane through said longitudinal axis.

9. The apparatus of claim 8 wherein each pair of second openings straddles said vertical longitudinal plane.

10. The apparatus of claim 9 wherein the second openings comprise an upper pair straddling the vertical central longitudinal plane and situated above the central horizontal plane and further comprise a lower pair straddling the vertical central longitudinal plane and situated below the central horizontal plane.

11. The apparatus of claim 1 wherein the first and second openings are asymmetrically located relative to said central longitudinal axis.

12. The apparatus of claim 11 wherein the axis of symmetry of the first and second openings is angled downwardly relative to the central longitudinal axis.

13. The apparatus of claim 11 wherein said axis of symmetry is angled downwardly approximately 20° relative to said central longitudinal axis.

14. The apparatus of claim 1 comprising a plurality of third openings spaced symmetrically about the barrel portion of the probe in a transverse plane situated rearward from said nose portion, said third openings being manifolded together to provide a single measurement of static pressure.

15. The apparatus of claim 1 wherein the exterior surface of said nose portion is generally rounded and smoothly curved.

16. The apparatus of claim 15 wherein the exterior surface of the mose portion is hemispherical in shape.

17. The apparatus of claim 1 further including a mounting strut attached near the rear of the cylindrical barrel portion for mounting the probe on the aircraft.

18. The apparatus of claim 17 wherein said strut is adapted to mount the probe to a side of the fuselage of the aircraft.

19. The method of taking air data measurements for an aircraft in flight comprising the steps of:
using an elongated central opening at the forward end of a generally cylindrical probe housing to develop a total pressure measurement, which central opening is elongated in a direction which is generally transverse to the central longitudinal axis of the cylindrical probe housing;
utilizing a first pair of off-axis forward openings mounted to either side of said elongated central opening above a central horizontal plane through the central longitudinal axis of the probe to provide a first measurement of angle of attack; and
utilizing a plurality of side openings mounted about the cylindrical housing of the probe at a position to the rear of the forward end for measuring static pressure.

20. The method of claim 19 further including utilizing a second pair of off-axis forward openings mounted to either side of said elongated central opening below the central horizontal plane through the central axis to provide a second measurement of angle of attack.

21. The method of claim 20 wherein the elongated central opening is elongated in the vertical direction and wherein the sides of said opening are non-parallel and relatively close toegether.

22. The method of claim 21 wherein the off-axis forward openings are generally equally spaced about the central longitudinal axis and are displaced from said central opening.

23. The method of claim 21 wherein the off-axis forward openings straddle the elongated central opening and are manifolded together by pairs.

24. The method of claim 21 wherein the elongated central opening is situated symmetrically about the longitudinal axis of the generally cylindrical probe housing.

25. The method of claim 21 wherein the elongated central opening is asymmetrically located relative to the longitudinal axis of the generally cylindrical probe housing.

26. The method of claim 25 wherein the axis of symmetry of the elongated central opening is angled downwardly relative to the longitudinal axis of the generally cylindrical housing.

27. The method of claim 26 wherein said axis of symmetry is angled downwardly approximately 20° relative to said longitudinal axis.

* * * * *